United States Patent

[11] 3,602,720

[72] Inventor  Jerry W. Hagood
             Huntsville, Ala.
[21] Appl. No. 881,804
[22] Filed    Dec. 3, 1969
[45] Patented Aug. 31, 1971
[73] Assignee The United States of America as
              represented by the Secretary of the Army

[54] RADIO FREQUENCY INTERFERENCE FILTER FOR OPTICAL INSTRUMENTATION
     1 Claim, 1 Drawing Fig.

[52] U.S. Cl. ..................................................... 250/237,
                                                                333/73 W
[51] Int. Cl. ..................................................... H01j 3/14
[50] Field of Search ........................................... 250/217 SI,
                                     237, 239; 333/1, 73 W, 98, 98 M

[56]                    References Cited
                    UNITED STATES PATENTS
2,588,226   3/1952   Fox ............................... 333/73 W
2,816,270  12/1957   Lewis ............................ 333/73 W X
3,385,970   5/1968   Coffin, Jr. et al. ............ 250/217 SI UX
3,451,014   6/1969   Brosnahan et al. ............ 333/98 X Primary Examiner—Eli Lieberman
Assistant Examiner—Paul L. Gensler
Attorneys—Harry M. Saragovitz, Edward J. Kelly, Herbert Berl and Aubrey J. Dunn ABSTRACT: A rectangular waveguide that filters out radio frequency interference but passes the visible spectrum therethrough to an electromagnetic detector is disclosed. The waveguide is chosen to cut off radio frequencies below a desired frequency lower than the visible spectrum. RAdio frequencies above the desired frequency and below the visible spectrum are filtered out in the waveguide. Electromagnetic energy enters the waveguide. The other end has a detector behind a cylindrical opening. A conductive shield surrounds the cylindrical opening and the detector. The shield makes electrical contact with the sides of the waveguide. The length of the cylindrical opening is chosen dependent on whether any additional radio frequency attenuation is needed, and such that focused radiation of the visible spectrum will pass unimpeded through the opening to the detector. Radio frequency interference is trapped in branch arms of the waveguide by an arrangement of shorted and open waveguide sections that show a high impedance to chosen radio frequencies.

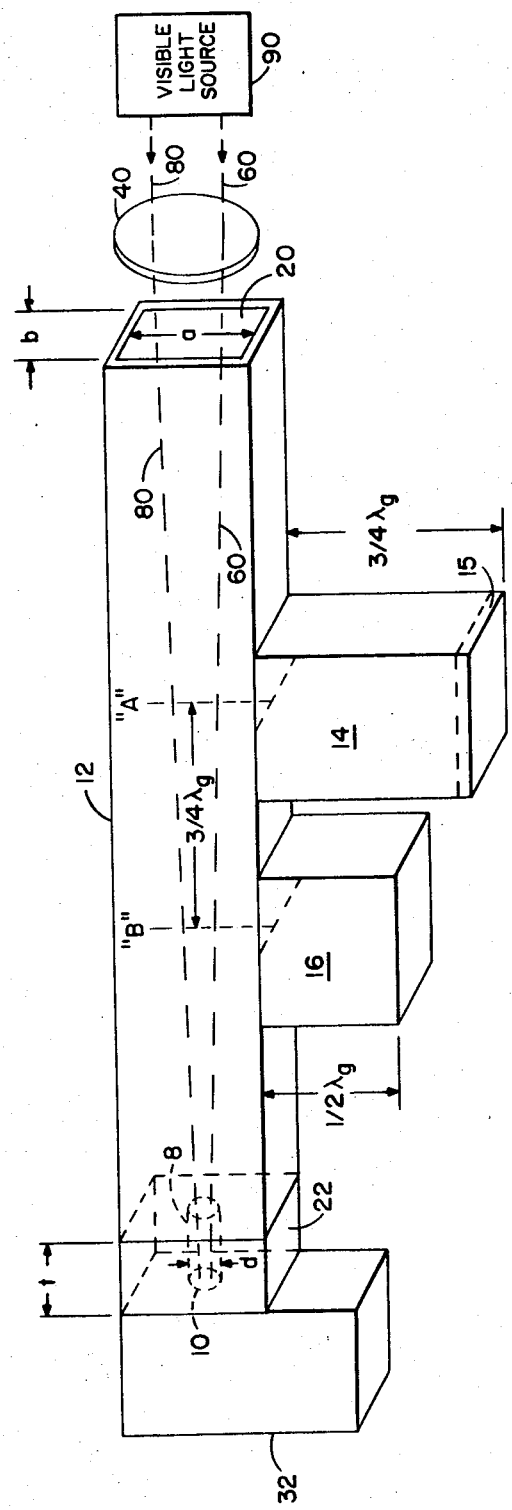

RADIO FREQUENCY INTERFERENCE FILTER FOR OPTICAL INSTRUMENTATION

BACKGROUND OF THE INVENTION

This invention is in the field of devices for detecting visible radiation in a background of other electromagnetic radiations. In the field of radio astronomy many stellar bodies emit visible light and other electromagnetic radiations, and with a wide band detector it is difficult to determine what portion is from the visible spectrum and what is other electromagnetic radiation. Further, the device may be in proximity to a transmitting radar while detecting visible radiation from some remote visible source. Radio frequency interference from the radar will be detected along with the visible spectrum if the detecting device is using a broad band detector. The present device provides a filter for radio frequency interference in the presence of the visible spectrum.

SUMMARY OF THE INVENTION

A rectangular waveguide device for filtering out radio frequency interference while passing a visible spectrum therethrough at one end. The waveguide is chosen to cut off radio frequencies at some desired frequency lower than the visible spectrum. Radio frequencies above the desired frequency and below the visible spectrum are filtered out in the waveguide. The waveguide has a cylindrical opening at the other end surrounded by a conductive shield. The shield makes electrical contact with the sides of the waveguide to prevent radiation from the other end of the waveguide. The length of the cylindrical opening is chosen dependent on whether any additional radio frequency attenuation is needed, and such that converged radiation of the visible spectrum will pass unimpeded through the opening to an electromagnetic detector at the back of the opening.

Any radio frequency interference above cutoff frequency that enters the waveguide is filtered out by two branch arms connected to the waveguide. The first branch arm is terminated in its characteristic impedance because of an absorbing material at the end thereof. The second arm is a shorted half wave section that reflects energy back through the waveguide to the first branch arm. Therefore, an effective high impedance to radio frequency propogation through the waveguide is present.

BRIEF DESCRIPTION OF THE DRAWING

The single FIGURE shows a perspective view of the waveguide according to the invention.

DESCRIPTION OF THE PREFERRED EMBODIMENT

The single FIGURE illustrates a radio frequency interference filter waveguide 12 that is dimensioned below cut off at its input 20 for radio frequency waves below a chosen frequency. For optimum operation, the overall length of waveguide 12 is at least six wavelengths of the cutoff radio frequency. As an illustration of this invention, it is assumed that X-band radio frequency interference is present that interferes with measurement of the visible spectrum. The waveguide is dimensioned at end 20 with the narrow side, $b$, equal in length to one-fourth of a free space wavelength of the lower limit frequency of X-band. The broad side, $a$, is equal to one-half of a free space wavelength of the lower limit frequency of X-band. With the dimensions of the waveguide being at the lower limit of the X-band, all wavelengths that are longer than X-band cannot enter the waveguide to be propogated therethrough. The X-band waves that enter waveguide 12 are filtered at point "A" while the visible spectrum is passed on through the waveguide to electromagnetic detector 10.

In the operation of the waveguide, visible radiation, in the form of a beam including rays 60 and 80, from light source 90, are focused by a lens 40 down waveguide 12, through a cylindrical opening 8, and onto electromagnetic detector 10 therein. It is assumed that the waveguide is operating in the $TE_{1,0}$ mode. A first branch arm 14 is $\frac{3}{4}\lambda_g$ of a median of X-band frequency and a second branch arm 16 is $\frac{1}{2}\lambda_g$ of a median of X-band frequency. The centers "A" and "B" of the two branch arms are spaced apart at $\frac{3}{4}\lambda_g$ of the median of X-band frequency. An X-band wavelength will see an effective high impedance at point "A" in as much as any radiation passing point "A" will be reflected from shorted branch arm 16, and pass the X-band frequencies into a first branch arm 14 which is of three-fourths wavelength, and is terminated in its characteristic impedance. This characteristic impedance for X-band frequency energy is provided in absorbing material 15 at the end of first branch arm 14. The absorbing material may be a strip of dielectric on which a film of resistive material is deposited.

A conductive plug 22 at the other end from end 20 of the waveguide has a cylindrical opening 8 therethrough. Conductive shield container 32, shielding the electromagnetic detector 10 and any electronics associated therewith, is in electrical contact with waveguide 12. Cylindrical opening 8 has an additional attenuating effect on any X-band energy that may pass points "A" and "B." For a rectangular waveguide operating in the $TE_{1,0}$ mode, the effect of a small centered hole in a thin metal diaphragm is a shunting susceptance. For a hole of diameter, $d$, the susceptance of the hole normalized to the guide admittance is $$\frac{B}{Y_o} = \frac{3ab\lambda_g}{2\pi d^3}$$

where:
$a$ = long side of guide
$b$ = short side of guide
$d$ = diameter of hole
$\lambda_g$ = guidewave length The insertion loss of a hole in an infinitely thin diaphragm placed between a matched source and receiver is given by:

$$\alpha_1 = 10 \log_{10} \left[ \frac{(B)^2}{(Y_o)^2} - 1 \right] \text{ decibels}$$

Finite thickness, $t$, of the diaphragm results in an additional attenuation, given by:

$$\alpha_2 = 32.0(t/d) \text{ decibels.}$$

The overall attenuation of the hole is then $\alpha_1 = \alpha_1 + \alpha_2$. The guide should always be made as small as possible to avoid operating modes at lower frequencies.

Even though this invention has been illustrated as rejecting all wavelengths longer than X-band at input 20 of waveguide 12, and then filtering X-band frequencies within the waveguide, another band of radio frequency interference, such as K-, Q-, or V-bands, could be present when measuring the visible spectrum. If one of these other bands of radio frequency interferences are present, for example K-band, the dimensions at one end 20 of waveguide 12 would be at the lower limit of K-band frequency wavelength and the length of branch arms 14 and 16 changed to values for K-band wavelengths.

I claim:

1. A device for detecting visible electromagnetic energy in the presence of radio frequency interference comprising: a rectangular waveguide having two ends; means for focusing the visible electromagnetic energy into one end of said waveguide; first and second branch arms connected to the narrow side of said waveguide between said ends, said first and second branch arms being dimensioned to present a high impedance to said radio frequency interference; a conducting plug at the other end of said waveguide having a cylindrical opening along the longitudinal axis of the waveguide; a gallium-arsenide diode electromagnetic detector positioned within said cylindrical opening for receiving electromagnetic energy; wherein the narrow side of said waveguide is equal to one-fourth of a free space wavelength of the radio frequency interference and wherein the broad side of said waveguide is equal to onehalf of a free space wavelength of said interference, wherein said first branch arm is three-fourths of a wavelength of the radio frequency interference, wherein said second branch arm is one-half of a wavelength of said interference whereby said second branch arm acts as a short back through said waveguide to said first branch arm for causing an effective high impedance to said radio frequency interference, wherein said first and second branch arms are positioned three-fourths of a wavelength apart, and wherein said first branch arm is terminated in its characteristic impedance by an absorbing material at the end of its three-fourths of a wavelength.